Jan. 21, 1936.                L. GELBMAN                2,028,445
BRAKE FOR FOOT STEERED VEHICLES
Filed April 22, 1935
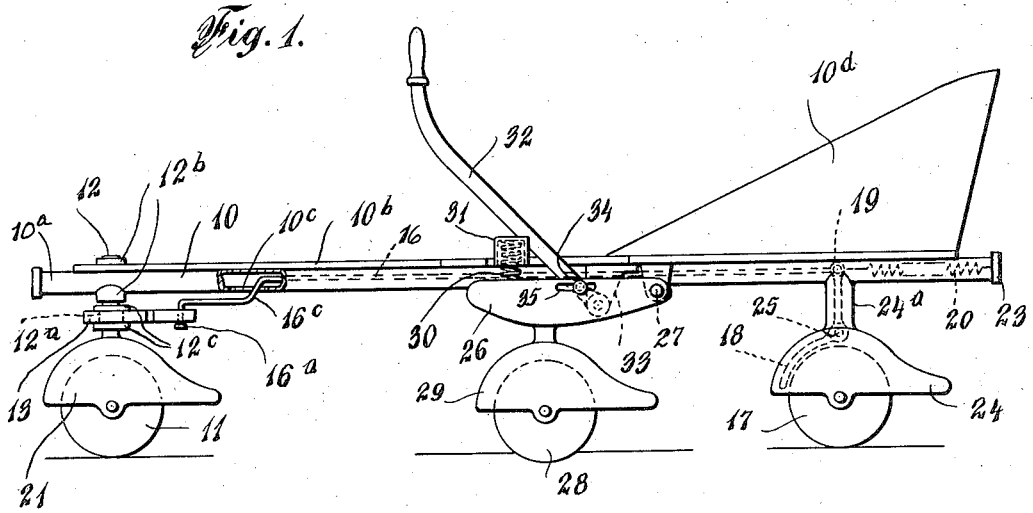
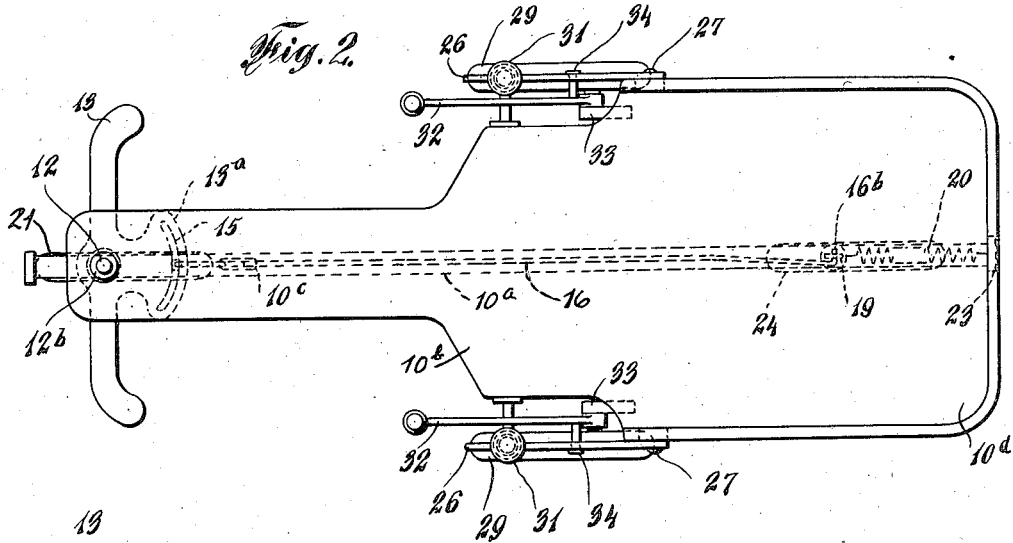
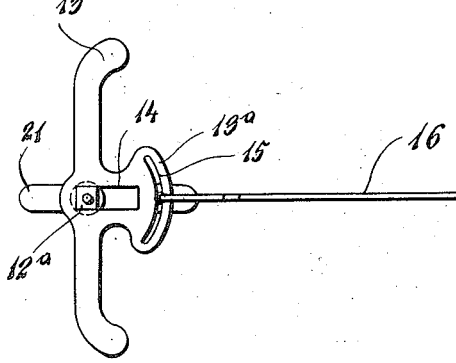
INVENTOR.
LOUIS GELBMAN.
BY
ATTORNEY Patented Jan. 21, 1936

2,028,445

UNITED STATES PATENT OFFICE 2,028,445

BRAKE FOR FOOT STEERED VEHICLES

Louis Gelbman, Yonkers, N. Y.

Application April 22, 1935, Serial No. 17,611

8 Claims. (Cl. 188—20)

This invention relates to new and useful improvements in a brake for foot steered vehicles.

The invention particularly relates to vehicles provided with a transverse steering foot bar by which the vehicle may be steered, and contemplates a provision whereby a brake thereof may be applied by a forward motion of said transverse steering foot bar in any of its pivoted positions for the steering of the vehicle.

One application of this invention is to a scooter plane as described in my co-pending application, Serial No. 6,150, filed February 12th, 1935.

More particularly, the invention contemplates an arrangement wherein the transverse steering foot bar is formed with a longitudinal opening engaging a square shank connected with a front steering wheel or element for steering the vehicle and movable longitudinally in all positions required for said steering operation.

Another one of the objects of this invention is the arrangement of a transverse slot in a transverse steering foot bar engaging a hook end on a brake rod connected for operating a brake of the vehicle when the transverse steering foot bar is moved longitudinally forwards, and to release the brake when the foot bar is released so that it automatically moves longitudinally rearwards.

Still further the invention proposes the construction of a device as described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a foot steered vehicle constructed with a brake according to this invention.

Fig. 2 is a plan view of Fig. 1.

Fig. 3 is a plan view of certain of the parts shown in Fig. 2, but illustrated per se.

The brake for foot steered vehicles, according to this invention, comprises a body 10 equipped with a front steering wheel 11 swivelly mounted thereon and having a square shank 12a. A transverse steering foot bar 13 is formed with a longitudinal opening 14 engaging said shank 12a for pivoting said shank in various longitudinal positions thereof. Said transverse steering foot bar 13 has a rear portion 13a formed with an arcuate transverse opening 15, preferably having its center of curvature substantially coinciding with the pivotal mounting of the front steering wheel 11. A rod 16 is slidably mounted upon the body 10 and has its front end 16a engaging through said transverse opening 15 for unitary longitudinal motion with said transverse steering foot bar 13.

The vehicle is provided with a rear wheel 17 mounted on the body thereof and equipped with a brake 18 operable with an operating rod 19 connected with the rear end 16b of the rod 16. Resilient means in the form of a spring 20 is connected with the operating rod 19 and normally urges the brake into an inoperative condition.

The body 10, as illustrated on the drawing, comprises a tubular member 10a attached along the longitudinal center and beneath a base 10b. This base is formed with a rear seat 10d.

The front steering wheel 11 is rotatively mounted within a guard 21 which is fixed on the shank 12. This shank 12 engages through the tubular member 10a and the base 10b and is equipped with several collars 12b adapted to swivelly support the shank. The shank 12 is equipped with additional collars 12c arranged above and below the transverse steering foot bar 13 so as to maintain the latter element in position on the square shank portion 12a thereof. The rod 16 has a bent portion 16c extending through an opening 10c in the tubular member 10a in such a manner that the front portion of the rod is to the outside thereof, while the main portion of the rod extends through the tubular member. The spring 20 acts between an end cap 23 upon the tubular member 10 and the end 16b of the rod. This end 16b engages through the operating arm 19.

The wheel 17 is rotative within a guard 24 which has a neck portion 24a by which it is attached to the tubular member 10. The brake 18 comprises a brake arm adapted to engage the periphery of the wheel 17 and is pivotally supported by a pintle pin 25 upon the guard 24. The arm 19 is integral with the brake 18 and extends upwards through the neck portion 24a to the interior of the tubular member 10 where it pivotally connects with the end 16b of the rod. The arrangement is such that when the rod 16 is moved forward the brake arm 18 will be urged against the wheel 17.

The vehicle is provided, as illustrated on the drawing to show the application of the brake, with a pair of side arms 26 pivotally mounted at one of their ends on pintles 27 upon the body 10. Wheels 28 are rotatively mounted in guards 29 which are attached on the arms 26. The arms 26 are urged downwards by springs 30 acting between the arms and brackets 31 attached on the body 10. Each arm 26 is associated with a lever 32 which is pivotally mounted at its bottom end upon a lug 33 on the body 10. These levers 32 have laterally projecting pins 34 engaging in horizontal slots 35 formed in the arms 26 and arranged so that when the top ends of the levers 32 are drawn rearwards, the arms 26 will be pivoted so as to raise the wheels 28 out of contact with the ground.

The operation of the brake is as follows:—The operator of the vehicle sits on the seat and has his feet resting upon the ends of the transverse steering foot bar 13. The bar 13 may be pivoted towards the right or the left to steer towards the right or the left. In any turned position for steering, the operator may force the transverse steering bar 13 forwards as permitted by the longitudinal slot 14, against the restraining action of the spring 20 so as to move the rod 16 forwards and thus apply the brake 17.

The purpose of the levers 32 is to lift the wheel 28 out of contact with the ground so that an operator may coast on the wheels 11 and 17, which necessitates perfect balancing.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A brake for foot steered vehicles comprising a body, a front steering wheel swivelly mounted thereon and having a shank with straight sides, a transverse steering foot bar having a longitudinal opening engaging the straight sides of said shank for pivoting said shank in various longitudinal positions thereof, said transverse steering foot bar having a portion with a transverse opening, a rod slidably mounted on said body and having a portion engaging said transverse opening for unitary longitudinal motion with said transverse steering foot bar, a wheel for the body, and a brake associated therewith and having an operating arm connected with another portion of said rod.

2. A brake for foot steered vehicles comprising a body, a front steering wheel swivelly mounted thereon and having a shank with straight sides, a transverse steering foot bar having a longitudinal opening engaging the straight sides of said shank for pivoting said shank in various longitudinal positions thereof, said transverse steering foot bar having a portion with a transverse opening, a rod slidably mounted on said body and having a portion engaging said transverse opening for unitary longitudinal motion with said transverse steering foot bar, a wheel for the body, a brake associated therewith and having an operating arm connected with another portion of said rod, and resilient means for releasing said brake and normally urging said transverse steering foot bar longitudinally rearwards.

3. A brake for foot steered vehicles comprising a body, a front steering wheel swivelly mounted thereon and having a square shank, a transverse steering foot bar having a longitudinal opening engaging said square shank for pivoting said shank in various longitudinal positions thereof, said transverse steering foot bar having a rear portion with a transverse opening, a rod slidably mounted on said body and having its front end engaging said transverse opening for unitary longitudinal motion with said transverse steering foot bar, a rear wheel for the body, a brake associated therewith and having an operating arm connected with the rear end of said rod, and resilient means for releasing said brake and normally urging said transverse steering foot bar into its rearward position, said body comprising a seat portion and a tubular member attached longitudinally on the bottom thereof, said rod engaging through an opening in the tubular member so that the front portion thereof extends and connects with the transverse steering foot bar, while the remaining portion of the rod is housed within said tubular member.

4. A brake for foot steered vehicles comprising a body, a front steering wheel swivelly mounted thereon and having a square shank, a transverse steering foot bar having a longitudinal opening engaging said square shank for pivoting said shank in various longitudinal positions thereof, said transverse steering foot bar having a rear portion with a transverse opening, a rod slidably mounted on said body and having its front end engaging said transverse opening for unitary longitudinal motion with said transverse steering foot bar, a rear wheel for the body, a brake associated therewith and having an operating arm connected with the rear end of said rod, and resilient means for releasing said brake and normally urging said transverse steering foot bar into its rearward positions, said body comprising a seat portion and a tubular member attached longitudinally on the bottom thereof, said rod engaging through an opening in the tubular member so that the front portion thereof extends and connects with the transverse steering foot bar, while the remaining portion of the rod is housed within said tubular member, said operating arm extending into the tubular member and being connected with the rod within said tubular member.

5. A brake for foot steered vehicles comprising a body, a front steering wheel swivelly mounted thereon and having a square shank, a transverse steering foot bar having a longitudinal opening engaging said square shank for pivoting said shank in various longitudinal positions thereof, said transverse steering foot bar having a rear portion with a transverse opening, a rod slidably mounted on said body and having its front end engaging said transverse opening for unitary longitudinal motion with said transverse steering foot bar, a rear wheel for the body, a brake associated therewith and having an operating arm connected with the rear end of said rod, and resilient means for releasing said brake and normally urging said transverse steering foot bar into its rearward position, said transverse opening being arcuate and having a center of curvature substantially coinciding with the pivotal mounting of said front steering wheel.

6. A brake for foot steered vehicles comprising a body, a front steering wheel swivelly mounted thereon and having a square shank, a transverse steering foot bar having a longitudinal opening engaging said square shank for pivoting said shank in various longitudinal positions thereof, said transverse steering foot bar having a rear portion with a transverse opening, a rod slidably mounted on said body and having its front end engaging said transverse opening for unitary longitudinal motion with said transverse steering foot bar, a rear wheel for the body, a brake associated therewith and having an operating arm connected with the rear end of said rod, and resilient means for releasing said brake and normally urging said transverse steering foot bar into its rearward position, said brake comprising a brake arm pivotally mounted and continuing into said operating arm, the brake arm being adapted to engage the periphery of said wheel.

7. A brake for foot steered vehicles comprising a body, a front steering wheel swivelly mounted thereon and having a square shank, a transverse steering foot bar having a longitudinal opening engaging said square shank for pivoting said shank in various longitudinal positions thereof, said transverse steering foot bar having a rear portion with a transverse opening, a rod slidably mounted on said body and having its front end engaging said transverse opening for unitary longitudinal motion with said transverse steering foot bar, a rear wheel for the body, a brake associated therewith and having an operating arm connected with the rear end of said rod, and resilient means for releasing said brake and normally urging said transverse steering foot bar into its rearward position, said brake comprising a brake arm pivotally mounted and continuing into said operating arm, the brake arm being adapted to engage the periphery of said wheel, and said resilient means comprising a spring connected with the rear end of said rod and with said body.

8. A brake for foot steered vehicles comprising a body, a front steering wheel swivelly mounted thereon and having a square shank, a transverse steering foot bar having a longitudinal opening engaging said square shank for pivoting said shank in various longitudinal positions thereof, said transverse steering foot bar having a rear portion with a transverse opening, a rod slidably mounted on said body and having its front end engaging said transverse opening for unitary longitudinal motion with said transverse steering foot bar, a rear wheel for the body, a brake associated therewith and having an operating arm connected with the rear end of said rod, and resilient means for releasing said brake, and normally urging said transverse steering foot bar into its rearward position, said brake comprising a brake arm pivotally mounted and continuing into said operating arm, the brake arm being adapted to engage the periphery of said wheel, and said resilient means comprising a spring connected with the rear end of said rod and with said body, said spring being housed within a tubular member constituting a portion of said body.

LOUIS GELBMAN.